US011414773B2

(12) United States Patent
Dong et al.

(10) Patent No.: US 11,414,773 B2
(45) Date of Patent: Aug. 16, 2022

(54) METHOD OF MANUFACTURING SURFACE NANOTUBE ARRAY ON SELECTIVE LASER MELTED STAINLESS STEEL

(71) Applicant: University of Science and Technology Beijing, Beijing (CN)

(72) Inventors: Chaofang Dong, Beijing (CN); Xiaogang Li, Beijing (CN); Xuequn Cheng, Beijing (CN); Ruixue Li, Beijing (CN); Decheng Kong, Beijing (CN); Ni Li, Beijing (CN); Xiaoqing Ni, Beijing (CN); Liang Zhang, Beijing (CN); Kui Xiao, Beijing (CN)

(73) Assignee: University of Science and Technology Beijing, Beijing (CN)

( * ) Notice: Subject to any disclaimer, the term of this patent is extended or adjusted under 35 U.S.C. 154(b) by 0 days.

(21) Appl. No.: 16/649,354

(22) PCT Filed: Jul. 25, 2019

(86) PCT No.: PCT/CN2019/097719
§ 371 (c)(1),
(2) Date: Mar. 20, 2020

(87) PCT Pub. No.: WO2020/248340
PCT Pub. Date: Dec. 17, 2020

(65) Prior Publication Data
US 2022/0152704 A1 May 19, 2022

(30) Foreign Application Priority Data
Jun. 14, 2019 (CN) .......................... 201910514183.1

(51) Int. Cl.
*C25D 11/34* (2006.01)
*C25D 9/06* (2006.01)
(Continued)

(52) U.S. Cl.
CPC ................ *C25D 11/34* (2013.01); *B22F 3/24* (2013.01); *B22F 10/22* (2021.01); *C25D 9/06* (2013.01);
(Continued)

(58) Field of Classification Search
None
See application file for complete search history.

(56) References Cited

FOREIGN PATENT DOCUMENTS

| CN | 106521604 | 3/2017 |
| CN | 106835239 | 6/2017 |

OTHER PUBLICATIONS

Zhang "Nanopore Arrays and Three-Dimensional Graphene Fabricated on 316 L Stainless Steel Surface and its Biocompatability Evaluations," Dissertation for the Degree of Master in Engineering, Wuhan University of Science and Technology, May 22, 2016, 72 pages (English abstract) (Year: 2016).*

(Continued)

*Primary Examiner* — Louis J Rufo
(74) *Attorney, Agent, or Firm* — Fish & Richardson P.C.

(57) ABSTRACT

The present disclosure provides a method of manufacturing a surface nanotube array of a laser-melted stainless steel, including a step of an anodic oxidation treatment on the stainless steel, which includes performing the anodic oxidation treatment on the stainless steel by applying a voltage between the stainless steel as an anode and a graphite as a cathode in a solution formed by using sodium dihydrogen phosphate, perchloric acid, and ethylene glycol as a solute, and deionized water as a solvent.

9 Claims, 2 Drawing Sheets

(51) Int. Cl.
- *B22F 10/22* (2021.01)
- *B22F 3/24* (2006.01)
- *B82Y 30/00* (2011.01)
- *B82Y 40/00* (2011.01)

(52) U.S. Cl.
CPC ......... *B22F 2003/242* (2013.01); *B82Y 30/00* (2013.01); *B82Y 40/00* (2013.01)

(56) References Cited

OTHER PUBLICATIONS

CN Office Action in Chinese Appln. No. 201910514183.1, dated Mar. 3, 2020, 6 pages (English translation).

Curtarolo et al., "The high-throughput highway to computational materials design," Nature Materials, 2013, 12(3):1919-201.

PCT International Search Report in International Appln. No. PCT/CN2019/097719, dated Mar. 12, 2020, 10 pages.

Zhan, "Preparation and Photocatalytic and Antibacterial Properties of Micro-and Nano-Films on Stainless Steel," Ph.D. Dissertation Full-Text Database Engineering Technology Series I, No. 5, 2013, B022-17, May 15, 2013, 11 pages (English abstract).

Zhang "Nanopore Arrays and Three-Dimensional Graphene Fabricated on 316 L Stainless Steel Surface and Its Biocompatability Evaluations," Dissertation for the Degree of Master in Engineering, Wuhan University of Science and Technology, May 22, 2016, 72 pages (English abstract).

Zhang et al., "Preparation of 316L Stainless Steel Surface Microporous Structure in Sodium Dihydrogen Phosphate System," Electroplating and Finishing, Aug. 2016, 35(16):853-857 (English abstract).

Zhang et al., Principles of Electroplating, 1st ed., Sep. 1959, pp. 141-143 (English translation).

\* cited by examiner

METHOD OF MANUFACTURING SURFACE NANOTUBE ARRAY ON SELECTIVE LASER MELTED STAINLESS STEEL

CROSS REFERENCE OF RELATED APPLICATIONS

This application is a U.S. National Phase application under 35 U.S.C. § 371 of International Patent Application No. PCT/CN2019/097719, filed on Jul. 25, 2019, which claims the priority of Chinese Patent Application No. 201910514183.1, filed on Jun. 14, 2019, and entitled "METHOD OF MANUFACTURING SURFACE NANOTUBE ARRAY ON SELECTIVE LASER MELTED STAINLESS STEEL", the disclosure of which is incorporated herein by reference in its entirety.

FIELD

The present disclosure relates to the technical field of stainless steel materials via 3D printing, and in particular, to a method of manufacturing a surface nanotube array on a selective laser melted (SLM) stainless steel, belonging to the field of metal surface modification.

BACKGROUND

In recent years, 3D printing technology, as a new type of precision manufacturing technology, has been widely used because of its advantages such as fast processing speed, high material utilization, and unlimited shape of a formed part. A selective laser melting (SLM) technology as the most advanced technique in the entire 3D printing for metal system is an important development direction of advanced manufacturing technology because of a relative high dimensional accuracy, a low surface roughness, and denseness of samples. Taking the metal material such as a stainless steel as an example, due to its unique physical and chemical properties, it is widely used in photocatalysis, fuel cells, sensors, and biomedicine.

SUMMARY

The present disclosure provides a method of manufacturing a surface nanotube array on a selective laser melted stainless steel, which can modify microstructure of a stainless steel, thereby improving corrosion resistance of the surface of the stainless steel.

A method of manufacturing a surface nanotube array on a selective laser melted stainless steel, wherein the method includes: a step of an anodic oxidation treatment on the stainless steel including performing the anodic oxidation treatment on the stainless steel by applying a voltage between the stainless steel as an anode and a graphite as a cathode in a solution formed by using sodium dihydrogen phosphate, perchloric acid, and ethylene glycol as solutes and a deionized water as a solvent.

In one embodiment, the method further includes a step of performing an electrolytic polishing pretreatment on a surface of the stainless steel with a solution of phosphoric acid, sulfuric acid, and chromium trioxide, before the step of anodic oxidation treatment on the stainless steel.

In one embodiment, the method further includes performing a mechanical polishing pretreatment on the surface of the stainless steel before the step of anodic oxidation treatment on the stainless steel.

In one embodiment, the method further includes a step of cleaning a surface of the stainless steel before the step of anodic oxidation treatment on the stainless steel.

In one embodiment, the step of anodic oxidation treatment on the stainless steel includes: performing electrolysis with the stainless steel as the anode and a graphite plate as the cathode at a temperature of 0° C. and at a voltage of 5V or about 5V in a solution for 10 minutes, and wherein in the solution, 0.1 mol/L sodium dihydrogen phosphate, 0.3 mol/L perchloric acid, and 0.3 mol/L ethylene glycol are dissolved in a solvent of deionized water.

In one embodiment, the step of anodic oxidation treatment on the stainless steel includes performing electrolysis with the stainless steel as the anode and a graphite plate as the cathode at a temperature of 10° C. and at a voltage of 50V in a solution for 40 minutes, and wherein in the solution, 0.5 mol/L sodium dihydrogen phosphate, 0.05 mol/L perchloric acid, and 0.6 mol/L ethylene glycol are dissolved in the solvent of deionized water.

In one embodiment, the step of anodic oxidation treatment on the stainless steel comprises performing electrolysis with the stainless steel as the anode and a graphite plate as the cathode at a temperature of 3° C. and at a voltage of 25V in a solution for 25 minutes, and wherein in the solution, 0.3 mol/L sodium dihydrogen phosphate, 0.15 mol/L perchloric acid, and 0.45 mol/L ethylene glycol are dissolved in the solvent of deionized water.

In one embodiment, the step of anodic oxidation treatment on the stainless steel comprises performing electrolysis with the stainless steel as the anode and a graphite plate as the cathode at a temperature of 5° C. and at a voltage of 20V in a solution for 20 minutes, and wherein in the solution, 0.3 mol/L sodium dihydrogen phosphate, 0.05 mol/L perchloric acid, and 0.03 mol/L ethylene glycol are dissolved in the solvent of deionized water.

In one embodiment, during the step of anodic oxidation treatment on the stainless steel, an anode current density is 30 $A/dm^2$ to 60 $A/dm^2$.

In one embodiment, during the step of anodic oxidation treatment on the stainless steel, the electrolytic solution is stirred by a magnetic stirrer.

In one embodiment, a distance between the stainless steel and the graphite plate as the cathode is 35 to 55 mm.

In one embodiment, the surface nanotube on the selective laser melted stainless steel has a diameter of 200 to 400 nm and a depth of 50 to 150 nm.

The present disclosure also provides a stainless steel having further improved corrosion resistance and including a surface nanotube array, wherein the surface nanotube has a diameter of 200 nm to 400 nm and a depth of 50 nm to 150 nm.

DETAILED DESCRIPTION

Figure 1:
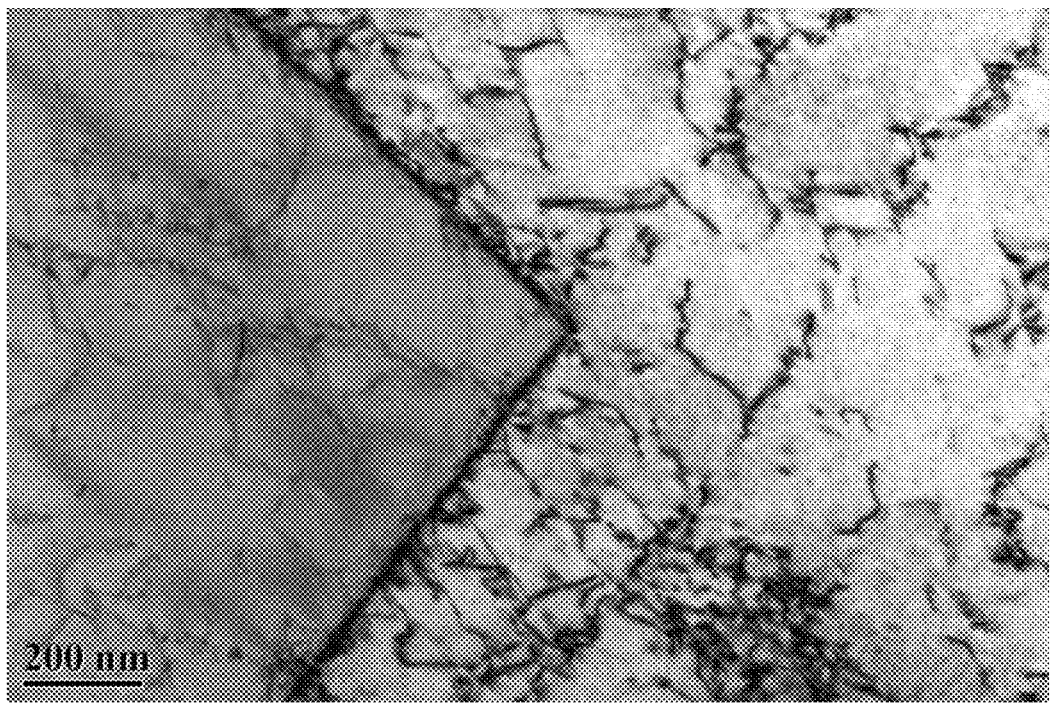
FIG. 1 is a transmission electron microscope image of a conventional rolled 316L stainless steel in embodiment 1.

Although the present disclosure allows various modifications and alternative forms, specific embodiments thereof are shown by way of example in the drawings and will be described in detail herein. It should be understood, however, that the accompanying drawings and detailed description are not intended to limit the present disclosure to the particular forms disclosed, but rather to cover all modifications, equivalents, and substitutions falling into the spirit and scope of the present disclosure as defined by the appended claims. The drawings are provided for illustration purposes and are not drawn to scale.

At present, there are many methods of surface nanomodification for a stainless steel (such as austenitic 316L stainless steel). Among them, anodization is considered a convenient and cheap modification method because of the simple process, strong controllability, and less requirements on the environment and instruments. It may not only directly modify a surface morphology of stainless steel, thereby forming a nanotube array structure, but also provide good conditions for obtaining stainless steel composite biomaterials and battery materials. The principle of an anodic oxidation treatment process is that: in an electrolyte, an austenitic stainless steel is used as an anode, and an oxide layer is formed on the surface of the austenitic stainless steel after being energized. The anodic oxidation of austenitic stainless steel is essentially resulted from electrolysis of water. After being energized, the electrolyte undergoes hydrolysis under the action of current and hydrogen is released on the cathode, negatively charged anions move to the anode and release electrons on the anode. Some generated atomic oxygens react with the anodic stainless steel to generate a nanotube array on the surface of the stainless steel. Some scholars have systematically studied the effect of anodizing conditions on the structure of an array of nanopits on the surface of stainless steel. A polished stainless steel sheet was used as an anode in perchloric acid contained, ethylene glycol solution, $NH_4F$ solution, $NH_4Cl$ solution, and sulfate solution respectively, and was subjected to an anodic oxidation treatment at a suitable voltage and temperature for a suitable time period. However, traditional stainless steel under the anodic oxidation treatment in the prior art generally has an anodic oxidation film with a large pore diameter, high porosity, and poor corrosion resistance. It is needed to further explore the influence of anodic oxidation on structure and the corrosion resistance of the stainless steel surface.

The present disclosure studies a method of manufacturing a surface nanotube array on a stainless steel (for example, a typical austenitic-type 316L stainless steel). Compared with a traditional rolled stainless steel, a selective laser melted stainless steel has characteristics in that a dislocation cell structure is obtained during rapid melting and solidification and at the same time, corrosion-resistant elements such as Cr and Mo are enriched on walls of the dislocation cell. These characteristics do not appear in the traditional rolled 316L stainless steel. In view of the special structure, the selective laser melted stainless steel is adopted and processed by an anodic oxidation treatment in order to obtain a surface containing a nanotube array achieving excellent performance.

In the following, the technical solutions in embodiments of the present disclosure will be definitely and completely described with reference to the drawings in the embodiments of the present disclosure. The described embodiments are only a part of the disclosure.

A method of manufacturing a surface nanotube array on a stainless steel includes a step of anodic oxidation treatment of the stainless steel. Specifically, the anodic oxidation treatment step includes performing an anodic oxidation treatment on the stainless steel by applying a voltage between the stainless steel as an anode and a graphite as a cathode in a solution in which sodium dihydrogen phosphate, perchloric acid, and ethylene glycol are a solute, and deionized water is a solvent. For example, a solution in which sodium dihydrogen phosphate of 0.1 mol/L, perchloric acid of 0.3 mol/L, and ethylene glycol of 0.3 mol/L are dissolved in a solvent such as deionized water is used. During the anodic oxidation treatment, the stainless steel is the anode and graphite plate is the cathode. The voltage used for electrolysis may be 5V or about 5V, an electrolytic temperature may be 0° C., and the electrolytic time may be 10 min.

The method of the embodiment is simple to be performed and a power source for the anodic oxidation treatment involves a single constant current, which is simple and easy to implement. After the anodic oxidation treatment, the structure of the surface of the selective laser melted stainless steel is complete and the surface nanotube array on the selective laser melted stainless steel is prepared, simultaneously obtaining a larger electrochemical surface area, providing more active sites for biological and catalytic fields and in addition, improving surface corrosion resistance, which has broad development prospects in industrial, biological, and energy source fields.

A method of manufacturing a surface nanotube array on a stainless steel may include a polishing step and an anodic oxidation treatment step. It should be noted that the polishing step may not be necessary.

The polishing step may include a mechanical polishing pretreatment step and/or an electrolytic polishing pretreatment step.

In one embodiment, the polishing step includes a mechanical polishing step. In the mechanical polishing pretreatment step, the surface of the stainless steel is mechanically polished to be pretreated. For example, a 316L stainless steel may be chose, and firstly polished with 400 #~2000 # silicon carbide sandpaper step by step. The 316L stainless steel may be further cleaned by using deionized water and dried, then ultrasonically cleaned again and degreased by using alcohol and acetone in sequence.

In other embodiments, other mechanical polishing devices may be used to perform the mechanical polishing pretreatment on the stainless steel surface.

In one embodiment, the polishing step includes the electrolytic polishing step. In the electrolytic polishing pretreatment step, the surface of the stainless steel is subjected to the electrolytic polishing pretreatment in an acidic solution. For example, in one embodiment, the 316L stainless steel is placed in a mixed solution of sulfuric acid and phosphoric acid. The mixed solution may contain 400 mL of phosphoric acid, 600 mL of sulfuric acid, and 5~30 g of chromium trioxide. The total volume of the solution of phosphoric acid and the sulfuric acid is 1 L. The 316L stainless steel is used as anode and the graphite plate is used as cathode. The electrolytic temperature is 70° C., a distance between the electrodes is 60 mm, and the electrolytic time period is 6 min. In other embodiments, other solutions may be used to perform the electrolytic polishing pretreatment on the stainless steel surface.

In the anodic oxidation treatment step, the anodic oxidation treatment is performed on the stainless steel. For example, a solution in which sodium dihydrogen phosphate of 0.1 mol/L, perchloric acid of 0.3 mol/L, and ethylene glycol of 0.3 mol/L are dissolved in a solvent such as deionized water is used. During the anodic oxidation treatment, the stainless steel is the anode and the graphite plate is the cathode. An electrolytic voltage may be 5V or about 5V, the electrolytic temperature may be 0° C., and the electrolytic time may be 10 min. In other embodiments, other solutions may be used, and the electrolysis conditions may be adjusted accordingly. After the anodic oxidation treatment was completed, the stainless steel was taken out, ultrasonically washed with ethanol and deionized water, and cooled to room temperature to obtain a stainless steel of which a surface has a nanotube array.

In one embodiment, after performing the electrolytic polishing pretreatment on the stainless steel surface, a cleaning step may be further included to clean the surface of the 316L stainless steel that is electrolytically polished. Specifically, the surface of the 316L stainless steel is ultrasonically cleaned with the acetone and the alcohol for 20 minutes, and then is rinsed with the deionized water and then dried.

In the electrolytic polishing pretreatment step, a high-temperature temperature-controlled water bath may be used to control the temperature of the electrolytic solution.

An anode current density in the electrolytic polishing pretreatment step may be 30 A/dm$^2$.

The volume of the electrolytic solution in the anodic oxidation treatment step may be 200 mL, and the electrolytic solution may be stirred with a magnetic stirrer.

The surface nanotube of the finally prepared 316L stainless steel can have an average diameter which can reach 100 nm, and an average depth of 50 nm.

In the anodic oxidation treatment step, the distance between the stainless steel as the anode and the graphite plate as the cathode may be set to 35 mm.

Figure 2:
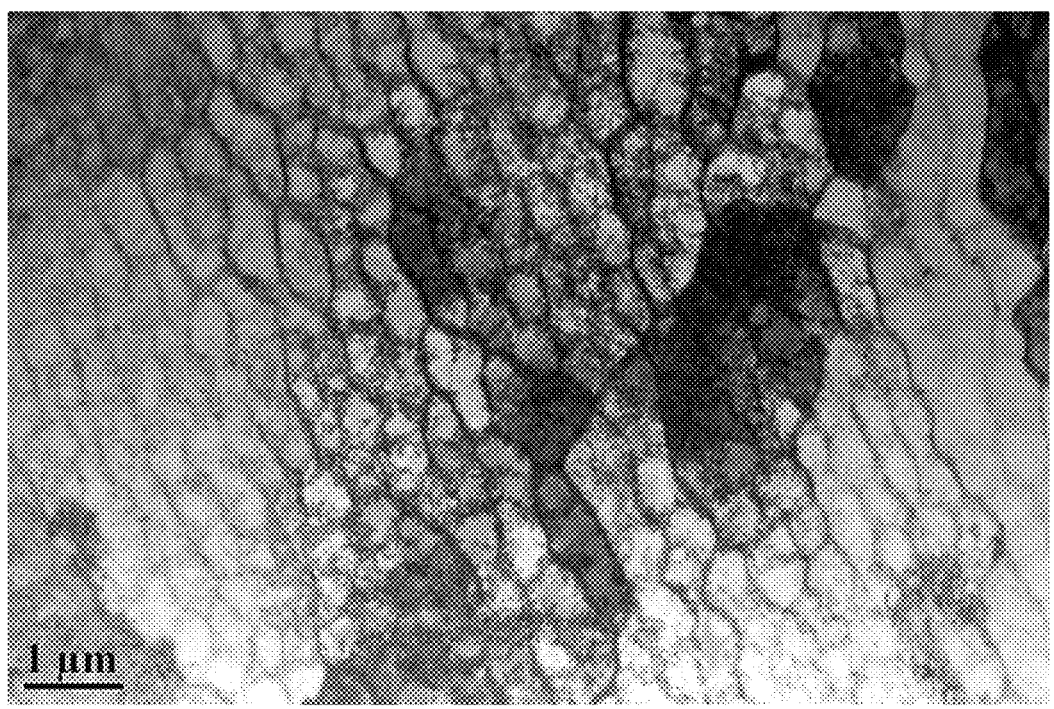
FIG. 2 is a transmission electron microscope image of SLM 316L stainless steel in embodiment 1.
Figure 3:
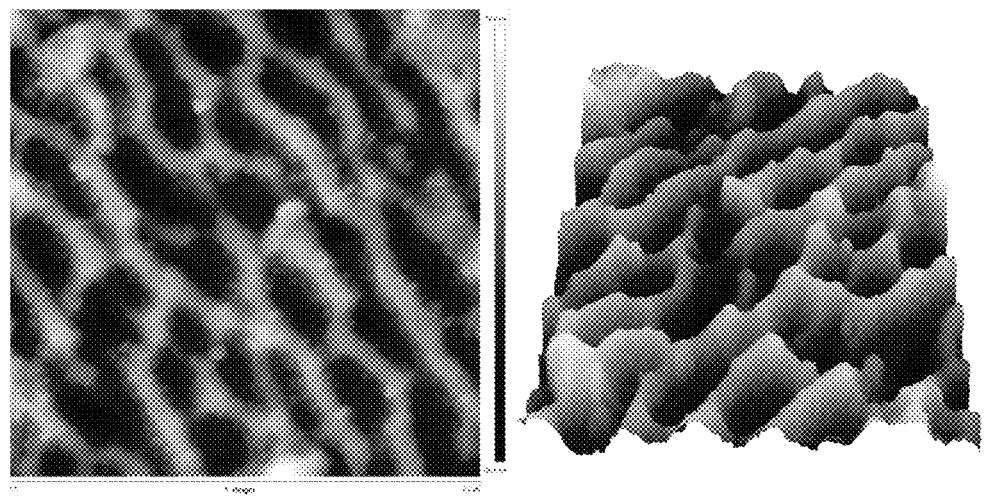
FIGS. 3(a) and 3(b) are schematic images respectively showing a surface morphology and a three-dimensional morphology of the SLM 316L stainless steel from an atomic force test after the anodic oxidation treatment in embodiment 1.

FIG. 1 is a transmission electron microscope image of 316L stainless steel in the above embodiment;

FIG. 2 is a transmission electron microscope image of 316L stainless steel in the above embodiment;

FIG. 3(a) is a schematic image showing a surface morphology from an atomic force test of the 316L stainless steel after the anodic oxidation treatment in the above embodiment; FIG. 3(b) is a schematic image showing a three-dimensional morphology from the atomic force test.

Figure 4:
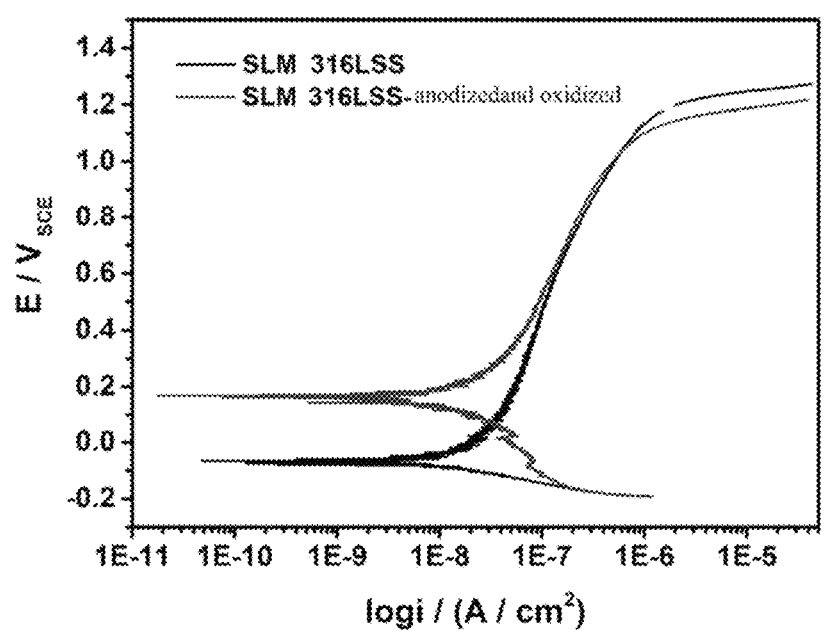
FIG. 4 is a schematic diagram of dynamic potential polarization of SLM 316L stainless steel in an alcoholic acid environment before and after the anodic oxidation treatment in embodiment 1.

FIG. 4 is a schematic diagram of dynamic potential polarization, in an alcoholic acidic environment, of a 316L stainless steel in the above embodiment, before and after the anodic oxidation treatment. The alcoholic acidic environment may simulate working environment of a fuel cell. The self-corrosion potential is used to evaluate the electrochemical corrosion resistance. The self-corrosion potential after the anodic oxidation treatment is greater than that of a base material, which indicates that the anodic oxidation treatment has improved the corrosion resistance.

In one embodiment of the present disclosure, a method of manufacturing a surface nanotube array on a stainless steel includes a polishing step and an anodic oxidation treatment step. The polishing step may include a mechanical polishing pretreatment step and/or an electrolytic polishing pretreatment step.

In the mechanical polishing pretreatment step, the surface of the stainless steel is mechanically polished to be pretreated. For example, a 316L stainless steel may be chose and firstly polished with 400 #~2000 # silicon carbide sandpaper step by step and then may also be cleaned with the deionized water and dried, and be then ultrasonically cleaned and degreased with alcohol and acetone in sequence again.

In the electrolytic polishing pretreatment step, the electrolytic polishing pretreatment is performed on the stainless steel surface. The 316L stainless steel is placed in a mixed solution of sulfuric acid and phosphoric acid. The mixed solution may contain 700 mL phosphoric acid, 300 mL sulfuric acid, and 30 g chromium trioxide. The total volume of the solution of the phosphoric acid and sulfuric acid is 1 L. The 316L stainless steel is used as the anode, and the graphite plate is used as the cathode. An electrolytic temperature is 90° C., a spacing between the electrodes is 40 mm, and an electrolytic time is 3 min.

In the anodic oxidation treatment step, the anodic oxidation treatment is performed on the stainless steel. For example, a solution in which sodium dihydrogen phosphate of 0.5 mol/L, perchloric acid of 0.05 mol/L, and ethylene glycol of 0.6 mol/L are dissolved in a solvent such as deionized water is used. In the anodic oxidation treatment process, the stainless steel is the anode and the graphite plate is the cathode. The electrolytic voltage is about 50V, the electrolytic temperature may be 10° C., and the electrolytic time may be 40 min. After the anodic oxidation treatment was completed, the stainless steel was taken out, ultrasonically washed with ethanol and deionized water, and cooled to room temperature to obtain a stainless steel of which a surface has a nanotube array.

In the electrolytic polishing pretreatment step, the temperature of the electrolytic solution may be controlled by using a high-temperature temperature-controlled water bath.

The anode current density in the electrolytic polishing pretreatment step may be 60 A/dm$^2$.

The volume of the electrolytic solution in the anodic oxidation treatment step may be 200 mL, and the electrolyte solution may be stirred with a magnetic stirrer.

The surface nanotube array of the finally prepared 316L stainless steel can have an average diameter which can reach 200 nm, and an average depth of 150 nm.

In the anodic oxidation treatment step, the distance between the stainless steel as the anode and the graphite plate as the cathode may be set to 55 mm.

In one embodiment of the present disclosure, a method of manufacturing a surface nanotube array on a stainless steel includes a polishing step and an anodic oxidation treatment step. Similarly, the polishing step may include a mechanical polishing pretreatment step and/or an electrolytic polishing pretreatment step, except that, in this embodiment, the mixed solution in the electrolytic polishing pretreatment step contains 500 mL phosphoric acid, 500 mL sulfuric acid, and 20 g chromium trioxide. The total volume of the solution of the phosphoric acid and sulfuric acid is 1 L, the electrolytic temperature is 80° C., the spacing between the electrodes is 50 mm, and the electrolytic time is 4 min.

The anodic oxidation treatment step is similar to the above-mentioned anodic oxidation treatment step, except that a solution in which 0.3 mol/L sodium dihydrogen phosphate, 0.15 mol/L perchloric acid, and 0.45 mol/L ethylene glycol are dissolved in a solvent such as deionized water is used. The voltage used for electrolysis is 25V, the temperature used is 3° C., and the electrolysis time is 25 min. After the anodic oxidation treatment is completed, the stainless steel was taken out, ultrasonically washed with ethanol and deionized water, and cooled to room temperature to obtain a stainless steel of which a surface has a nanotube array.

In the electrolytic polishing pretreatment step, the temperature of the electrolytic solution can be controlled by using a high-temperature temperature-controlled water bath.

The anode current density in the electrolytic polishing pretreatment step may be 50 A/dm$^2$.

The volume of the electrolytic solution in the anodic oxidation treatment step may be 200 mL, and the electrolyte solution may be stirred with a magnetic stirrer.

The surface nanotube of the finally prepared 316L stainless steel had an average diameter of 100 nm and an average depth of 100 nm.

In the anodic oxidation treatment step, the distance between the stainless steel as the anode and the graphite plate as the cathode may be set to 45 mm.

In one embodiment of the present disclosure, a method of manufacturing a surface nanotube array on a stainless steel includes a polishing step and an anodic oxidation treatment step. Similarly, the polishing step may include a mechanical polishing pretreatment step and/or an electrolytic polishing pretreatment step, except that, in this embodiment, the mixed solution used in the electrolytic polishing pretreatment step contains 450 mL phosphoric acid, 550 mL sulfuric acid, and 8 g chromium trioxide. The total volume of the solution of the phosphoric acid and sulfuric acid is 1 L. The electrolytic temperature is 85° C., the spacing between the electrodes is 50 mm and the electrolytic time is 3 min.

The anodic oxidation treatment step is similar to the above-mentioned anodic oxidation treatment step, except that a solution in which 0.3 mol/L sodium dihydrogen phosphate, 0.05 mol/L perchloric acid, and 0.3 mol/L ethylene glycol are dissolved in a solvent such as deionized water is used. The voltage used for electrolysis was 20V, the temperature used was 5° C., and the electrolytic time was 20 min. After the anodic oxidation treatment is completed, the stainless steel was taken out, ultrasonically washed with ethanol and deionized water, and cooled to room temperature to obtain a stainless steel of which a surface has the nanotube array.

The anode current density in the electrolytic polishing pretreatment step may be 60 A/dm$^2$.

The volume of the electrolyte solution in the anodic oxidation treatment step may be 200 mL, and the electrolyte solution may be stirred with a magnetic stirrer.

The surface nanotube of the finally prepared 316L stainless steel had an average diameter of 150 nm and an average depth of 120 nm.

In the anodic oxidation treatment step, the distance between the stainless steel as the anode and the graphite plate as the cathode may be set to 50 mm.

The present disclosure also provides a stainless steel having further improved corrosion resistance and including a surface nanotube array, wherein the surface nanotube has a diameter of 200 nm to 400 nm and a depth of 50 nm to 150 nm.

The stainless steel of this embodiment has further improved the surface properties on the basis of a traditional stainless steel, thereby obtaining improved corrosion resistance.

The above embodiments can be mixed and used with each other or with other embodiments based on design and reliability considerations, that is, the technical features in different embodiments can be freely combined to obtain more embodiments.

It should be noted that, the implementation manners not shown or described in the drawings or the text of the description are all known to those skilled in the art and have not been described in detail. In addition, the above definitions of the elements and methods are not limited to the various specific structures, shapes, or manners mentioned in the embodiments, and those skilled in the art can simply modify or replace them.

The above are only the preferred embodiments of the present disclosure, and the present disclosure is not limited to the embodiments. All equivalent replacements or changes by those skilled in the art within the technical scope disclosed in the present disclosure, according to the technical solutions and the disclosed concepts of the present disclosure, should be fallen into the protection scope of the present disclosure.

The invention claimed is:

1. A method of manufacturing a surface nanotube array on a selective laser melted stainless steel, the method comprising:
a step of an anodic oxidation treatment on the stainless steel including performing the anodic oxidation treatment on the stainless steel by applying a voltage between the stainless steel as an anode and a graphite as a cathode in a solution formed by using sodium dihydrogen phosphate, perchloric acid, and ethylene glycol as solutes.

2. The method according to claim 1, further comprising a step of electrolytic polishing pretreatment on a surface of the stainless steel with a solution of phosphoric acid, sulfuric acid, and chromium trioxide, before the step of anodic oxidation treatment on the stainless steel.

3. The method according to claim 2, further comprising performing a mechanical polishing pretreatment on the surface of the stainless steel before the step of anodic oxidation treatment on the stainless steel.

4. The method according to claim 1, further comprising a step of cleaning a surface of the stainless steel before the step of anodic oxidation treatment on the stainless steel.

5. The method according to claim 1, wherein the step of anodic oxidation treatment on the stainless steel comprises:
performing electrolysis with the stainless steel as the anode and a graphite plate as the cathode at a temperature of 0° C. and at a voltage of 5V or about 5V in a solution for 10 minutes, and wherein in the solution, 0.1 mol/L sodium dihydrogen phosphate, 0.3 mol/L perchloric acid, and 0.3 mol/L ethylene glycol are dissolved in a solvent of deionized water; or
performing electrolysis with the stainless steel as the anode and a graphite plate as the cathode at a temperature of 10° C. and at a voltage of 50V in a solution for 40 minutes, and wherein in the solution, 0.5 mol/L sodium dihydrogen phosphate, 0.05 mol/L perchloric acid, and 0.6 mol/L ethylene glycol are dissolved in the solvent of deionized water; or
performing electrolysis with the stainless steel as the anode and a graphite plate as the cathode at a temperature of 3° C. and at a voltage of 25V in a solution for 25 minutes, and wherein in the solution, 0.3 mol/L sodium dihydrogen phosphate, 0.15 mol/L perchloric acid, and 0.45 mol/L ethylene glycol are dissolved in the solvent of deionized water; or
performing electrolysis with the stainless steel as the anode and a graphite plate as the cathode at a temperature of 5° C. and at a voltage of 20V in a solution for 20 minutes, and wherein in the solution, 0.3 mol/L sodium dihydrogen phosphate, 0.05 mol/L perchloric acid, and 0.3 mol/L ethylene glycol are dissolved in the solvent of deionized water.

6. The method according to claim 5, wherein during the step of anodic oxidation treatment on the stainless steel, an anode current density is 30 A/dm$^2$ to 60 A/dm$^2$.

7. The method according to claim 5, wherein during the step of anodic oxidation treatment on the stainless steel, the electrolytic solution is stirred by a magnetic stirrer.

8. The method according to claim 5, wherein a distance between the stainless steel and the graphite plate as the cathode is 35 to 55 mm.

9. The method according to claim 1, wherein the surface nanotube on the selective laser melted stainless steel has a diameter of 200 nm to 400 nm and a depth of 50 nm to 150 nm.

* * * * *